J. D. Smedley,
Funnel.

Nº 40,193.  Patented Oct. 6, 1863.

Witnesses.
Jas. A. Cowles,
Daniel Goodwin Jr.

Inventor.
John D. Smedley

UNITED STATES PATENT OFFICE.

JOHN D. SMEDLEY, OF CHICAGO, ILLINOIS.

IMPROVEMENT IN FUNNELS.

Specification forming part of Letters Patent No. 40,193, dated October 6, 1863.

*To all whom it may concern:*

Be it known that I, JOHN D. SMEDLEY, of Chicago, county of Cook, State of Illinois, have invented a new and useful Improvement in Funnels to be Used in Filling Casks of Every Description with Liquids; and I do hereby declare that the following is a full and exact description thereof, reference being had to the accompanying drawings, making part of this specification, and to the letters of reference marked thereon, in which—

Figure 2:
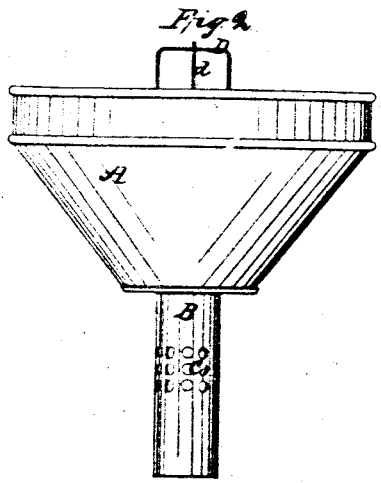
Figure 1:
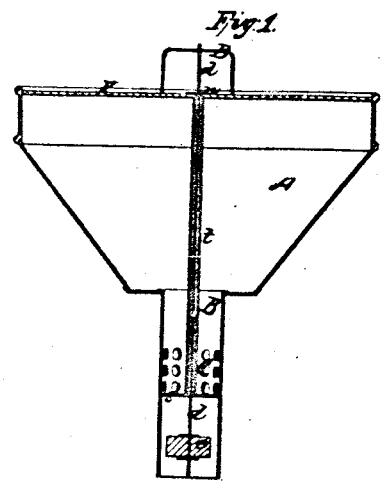
Figure 3:
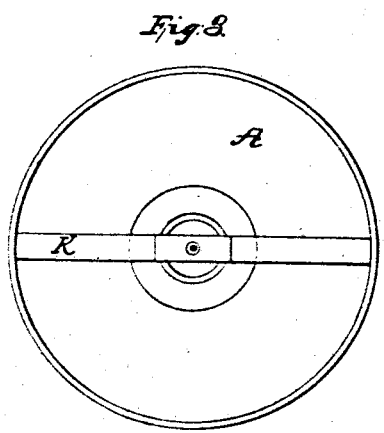
Figure 4:
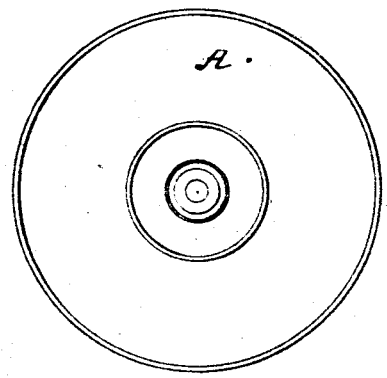

Figure 1 is a vertical sectional view; Fig. 2, a perspective view. Fig. 3 is a top view, and Fig. 4 a bottom view.

The nature of my invention consists in so constructing a funnel provided with an indicator to be used in filling casks, barrels, &c., with fluids that the precise height of fluid may be determined without removing the funnel or thumping or striking the cask to determine the height of the liquid by sound.

To enable others skilled in the art to make and use my invention, I will proceed to describe its construction and operation.

I construct my funnel in the ordinary form externally with a bowl and conduit leading from the lower or smaller end of the bowl to the requisite depth into the cask I wish to fill.

Similar letters refer to similar parts.

A, Fig. 2, is the bowl of the funnel. B is the conduit leading from the bottom or small end of the funnel. The conduit B is perforated with holes or side passages, as shown at C. Figs 1 and 2. Immediately below these holes there is a floor or division, s, made in the conduit B.

K, Figs. 1 and 3, is a cross-bar passing over the top of the funnel.

t, Fig. 1, is a small tube starting from the floor or division s, Fig. 1, perforating the same, passing up through the funnel, and terminating on the upper side of the cross-bar K.

D, Fig. 2, is a loop or guide resting upon the cross-bar K.

d is a small rod starting from above the guide D, passing down through the tube t, and extends to the lower end of the conduit B.

On the rod t, below the division or floor s, and within the conduit B, is attached a bob, e, of cork or other buoyant substance, of the requisite shape and size. On the upper end of the rod d is cut a screw. The nut or key n, Fig. 1, screws upon this end of the rod. When this funnel is in use, the liquid is poured into the bowl A, and passes down through the conduit B. It being intercepted in its course directly downward by the floor or division s, Fig. 1, passes through the holes or side passages, C, into the body of the cask. The bob e inside of the conduit B rests upon the surface of the fluid, and as the surface of the fluid rises its altitude is indicated at the upper end of the rod d.

The nut n, Fig. 1, can be adjusted at any desired point on the rod d which will enable you to fill the cask to any desired amount. As the cask is being filled the air escapes up through the tube t.

Some of the advantages of this invention are as follows: When the cask is being filled, you are able to see by the indicator the precise height of the fluid, enabling you to save any overflow, which in using the old-fashiond funnel is always more or less. You can also determine the precise amount in the cask at any time, thus enabling you to fill the cask to any fractional degree.

Having thus described my invention, what I claim as new, and desire to secure by Letters Patent, is—

1. In combination with a fluid-filling funnel, so adjusting the rod t by means of the nut n, or its equivalent, that the cask can be filled to any desired quantity.

2. The combination of the floor or division s of said funnel with the side passages, C, for the purpose and substantially as described.

3. The combination and arrangement in a fluid-filling funnel of the pipe t, rod d, bob e, division floor s, side passages, C, for the purpose and substantially as described.

4. Locating the bob e within the conduit B of said fluid-filling funnel, and below the division or floor s, substantially as and for the purpose described.

JOHN D. SMEDLEY.

Witnesses:
JAS. A. COWLES,
DANIEL GOODWIN, Jr.